(12) United States Patent
Kawai et al.

(10) Patent No.: US 6,384,940 B1
(45) Date of Patent: *May 7, 2002

(54) FACSIMILE DEVICE UTILIZING PROCESS UNIT FOR ELECTROPHOTOGRAPHIC DEVICE

(75) Inventors: Hideaki Kawai; Masahiro Fujimaru, both of Kyoto; Mitsuhiko Miyaoka, Shiga-gun; Yoshihiko Ohara, Ohmihachiman, all of (JP)

(73) Assignee: Murata Kikai Kabushiki Kaisha, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,671

(22) Filed: Apr. 15, 1998

(30) Foreign Application Priority Data

Apr. 21, 1997 (JP) .............................................. 9-117504
Jun. 17, 1997 (JP) .............................................. 9-176360

(51) Int. Cl.$^7$ ........................ H04N 1/041; G03G 21/18; G03G 15/02; G03G 15/04
(52) U.S. Cl. ...................... 358/474; 399/113; 399/116; 399/119
(58) Field of Search ................................ 358/474, 494, 358/496, 498; 355/210, 200; 755/401; 399/113, 116, 119

(56) References Cited

U.S. PATENT DOCUMENTS

| | | | | |
|---|---|---|---|---|
| 4,668,072 A | * | 5/1987 | Yasuda | 355/3 R |
| 4,862,212 A | * | 8/1989 | Tanzawa | 355/260 |
| 5,153,646 A | * | 10/1992 | Abuyama et al. | 355/245 |
| 5,345,294 A | * | 9/1994 | Nomura et al. | 355/200 |
| 5,477,306 A | * | 12/1995 | Iguchi et al. | 355/210 |
| 5,521,693 A | * | 5/1996 | Kojima | 355/326 R |
| 5,669,042 A | * | 9/1997 | Kobayashi et al. | 399/111 |
| 5,745,824 A | * | 4/1998 | Yashiro | 399/112 |
| 6,097,906 A | * | 8/2000 | Matsuzuki et al. | 399/90 |
| 6,154,623 A | * | 11/2000 | Suzuki et al. | 399/111 |
| 6,185,396 B1 | * | 2/2001 | Aizawa et al. | 399/121 |
| 6,215,969 B1 | * | 4/2001 | Nomura et al. | 399/111 |

FOREIGN PATENT DOCUMENTS

JP   363125970 A   *   5/1988   .......... G03G/21/00

* cited by examiner

*Primary Examiner*—Jerome Grant, II
(74) *Attorney, Agent, or Firm*—Hogan & Hartson, L.L.P.

(57) ABSTRACT

The present invention relates to a facsimile device utilizing an improved process unit for an electrophotographic image recording device. The process unit includes a development unit and a photosensitive (drum) unit. These two units can be integrally engaged with each other and the combined two units is as a whole removable from/attached to the facsimile device when maintenance is required due to jammed paper or the like. When one of the units is to be replaced with a new unit because of exhaustion or the like, the combined two units can be separated and subject to maintenance (replacement). In the present invention, this process unit is accommodated in a main body frame of a facsimile having an image recording part such that the unit can be removed from/attached to the main body frame in the vertical direction. A scan part frame having a continuous document scan part and a flat head bed scanner is rotatably mounted on the main body frame. In addition, an openable intermediate cover is provided in the main body frame surface such that the process unit in the main body frame can be easily approached by opening this cover.

6 Claims, 12 Drawing Sheets

FACSIMILE DEVICE UTILIZING PROCESS UNIT FOR ELECTROPHOTOGRAPHIC DEVICE

BACKGROUND OF THE INVENTION

1. Technical Field

The present invention relates to a facsimile device utilizing a process unit for an electrophotographic image recording device, and more specifically, a facsimile device where a drum unit and a development unit are separately structured to be combined as a process unit in use and the process unit is removable as a whole from the facsimile device body. In addition, the present invention specifically relates to a facsimile device having an electrophotographic image recording device where its scan part frame for accommodating a scanner is provided such that it can rotate around a fulcrum axis located along one side of the facsimile body and thus can expose a body frame for accommodating a recording part and a paper feeding part and where the process unit provided in the body frame can be removed/attached by opening an intermediate cover provided at the upper portion of the body frame.

2. Background Art

Conventionally, a process unit integrally constituted of a photosensitive drum, a charger, a development device and the like is used in an electrophotographic image recording device. The processing unit can be designed such that it can be removed from/attached to the facsimile main body. In a facsimile device having such an integrally constructed process unit, if the unit is designed as to be capable of making, say, ten thousand photocopies, information about when the unit to be exchanged and the like is output by assuming the remained life length of the unit according to the number of produced photocopies counted by a counter or the like provided in the image recording device. As a result, when such a process unit is used, no special attention needs to be paid for finding out the life length of the currently used photosensitive drum and the development device and the process unit is to be replaced only when the display of the facsimile main body outputs a replacement command.

In addition, a type of a facsimile device is also available in which means for scanning a document set on a platen glass (FBS: flat bed scanner) and an automatic document feeder (ADF) are both provided. This type of a facsimile device capable of such two document scanning methods has an advantage that it can both perform 1) feeding and scanning a sheet-shaped document by using ADF and transmitting the scanned image signals or 2) scanning a book-shaped document by using FBS and transmitting the scanned image data as desired.

As for the recording part provided in the facsimile device, in addition to the conventional thermosensitive paper and ink donor film method, an electrophotographic method (device) is now available. The electrophotographic recording part, when used in a facsimile device, has an advantage that it brings more excellent image quality of copies and easier and better handling/preservation of those copies.

As mentioned above, the photosensitive drum and the development device arranged in the process unit have to be replaced with new ones when each is exhausted. However, it is not desirable to replace the photosensitive drum and the development device all together because the life length is different in each component (the drum, the development device or the like) and replacing the components all together would waste some of the components that are still alive. Therefore, in some facsimile devices, the photosensitive drum unit and the development unit are separately designed such that each unit can be separately replaced according to the life length of each unit.

However, if the two (photosensitive drum and the development device) units are arranged such that they are to be separately removed/attached, a new problem arises because the unit removal/attachment work becomes troublesome when they have to be "separately" removed from the main body due to jammed paper or the like, even though wasting still usable components can be avoided. In addition, the conventional two separate units may cause another problem when each unit is aligned against each other and the image recording device. Therefore, an improved process unit of which removal/attachment is easy has been desired.

Further, when an electrophotographic recording part is provided in a facsimile device, that may result in an increased size of the whole device. In contrast, facsimile devices using the thermosensitive paper or ink donor film can be made small. Therefore, in a facsimile device using a conventional electrophotographic process unit, the device is generally designed as a device of relatively large size combined with a digital electrophotographic copying machines, as is the conventional electrophotographic copying machines. However, needless to say, a smaller-size machine having simpler layout and less maintenance requirements is also demanded in such facsimile devices having an electrophotographic process unit as in other facsimile devices.

Some conventional devices have attempted to solve the problems described above. For example, an invention discloses a combination of separately made drum unit and development unit that can integrally engaged with each other. However, the invention provides no disclosure about how accurate alignment can be achieved when each unit is integrally assembled.

Another invention mentions to an intermediate cover provided in the main frame surface (under a scan unit) that can open/close for removal of these units. However, the cover is rigidly attached to the frame surface with vises in this case and cannot be easily opened/closed if the scan unit is removed. That is, there is no prior art in which such an intermediate cover and a scan part frame can each make separate and free movement.

SUMMARY OF THE INVENTION

The present invention is to solve the aforementioned problems associated with the prior art. That is, one object of the present invention is to offer a facsimile device in which engagement means is provided in each of a photosensitive drum unit and a development unit such that they can be separatably engaged with each other by way of the engagement means. As a result, each unit can be separately replaced when it is exhausted without wasting the other. Also, the combined two units can be as a whole thus easily removed from/attached to a facsimile main body.

Another object of the present invention is to provide a smaller electrophotographic facsimile device that allows easier opening/closure of a scan part frame or the like placed on the main body as well as easier maintenance of the process unit in the main body and easier processing of paper.

The present invention relates to an image recording device in which toner image is electrophotographically formed on a photosensitive drum and the toner image is transferred to a paper for making a photocopy.

As a first aspect of the present invention, the photosensitive unit and the development unit are separately designed and removal/attachment means is provided in each of the two units such that they can be separatably engaged with each other. Accordingly, the photosensitive unit and the development unit can be separately replaced depending on life length when either of them is exhausted but can as a whole be removed from/attached to the facsimile main body when removal of jammed paper or the like is to be carried out.

As a second aspect of the present invention, a pair of support bodies projects from the development unit side to the photosensitive drum unit and a drum shaft end portion and a pin member are each provided on each side of the photosensitive unit (the pin member is provided vertically above the drum shaft end portion with a predetermined distance between them). Each pair of the drum shaft end portions and the pin members is arranged in the width direction. The drum shaft end portion and the pin member on each side are each engaged with an associated engagement groove provided on each support body such that the photosensitive unit can be aligned against the development unit. Due to this arrangement (the connection of the drum shaft and the pin member with the engagement groove on each support body), the two units can be integrally assembled.

As a third aspect of the present invention, a holding member capable of resiliently changing its shape corresponding to the insertion of the drum shaft and the pin member of the photosensitive unit is provided on each engagement groove formed at each support body of the development unit. As a result, since this resiliently bendable holding member pushingly holds the pin member of the photosensitive unit on each side, the photosensitive unit is prevented from floating up and also its attachment state can be confirmed with just a glance of an operator.

As a fourth aspect of the present invention, a main body frame having an electrophotographic recording part is arranged separately from a scan part frame having two-way scanning parts (one way is scanning a document fixedly placed on a platen and the other way is scanning a moving document). The scan part frame is placed right on the main body frame such that the scan part frame can be rotated around a fulcrum axis along a side of the main body frame. In addition, an intermediate cover that can open/close in the same direction as the scan part frame does is provided in the main body frame.

Due to this arrangement, the size of the whole device can be made small in the present invention. Also, due to the provision of the intermediate cover for removal/attachment of the process unit of the main body frame, the (electrophotographic) recording part arranged in the main body frame can be protected without being influenced by the operation of the scanning member and the like provided in the scan part frame. In addition, maintenance of the whole device becomes significantly easier by this separate arrangement of the scanning part and the recording part in different frames.

As a fifth aspect of the present invention, the electrophotographic process unit is arranged in the main body frame such that it can be vertically moved for removal/attachment when the intermediate cover is opened. In addition, the process unit is fixedly held at its standard operational position when the intermediate cover is closed. Since the process unit can be accurately aligned and held at the position in the main body frame by the intermediate cover, it is not subjected to any undesirable influence from the opening/closing operation of the scan part frame arranged above it.

As a sixth aspect of the present invention, a platen for loading a document is provided on the upper surface of the scan part frame, and an upper open/close frame having in its upper portion a document feed tray and a document discharge tray corresponding to the automatic document feeder is provided on the upper surface of the platen. More specifically, the upper open/close frame is provided such that it can rotate in the direction perpendicular to the opening/closing direction of the scan part frame (but the fulcrum axis must be horizontal), and the automatic document feeder is also provided on the upper open/close frame (on the fulcrum axis side of the scan part frame) such that a document is fed from the document feed tray to the document discharge tray through the automatic document feeder with making a U-turn in the feeder. Further, the members (mechanism) such as the trays and the automatic document feeder are each integrally provided in the upper open/close frame such that they do not undesirably project from the scan part frame. Yet further, the upper open/close frame is prevented from making any unwanted movements when the scan part frame is opened/closed.

DESCRIPTION OF THE PREFERRED EMBODIMENT

Below, the preferred embodiment of a facsimile device utilizing a process unit of the present invention will be described with reference to the accompanying drawings.

Figure 1:
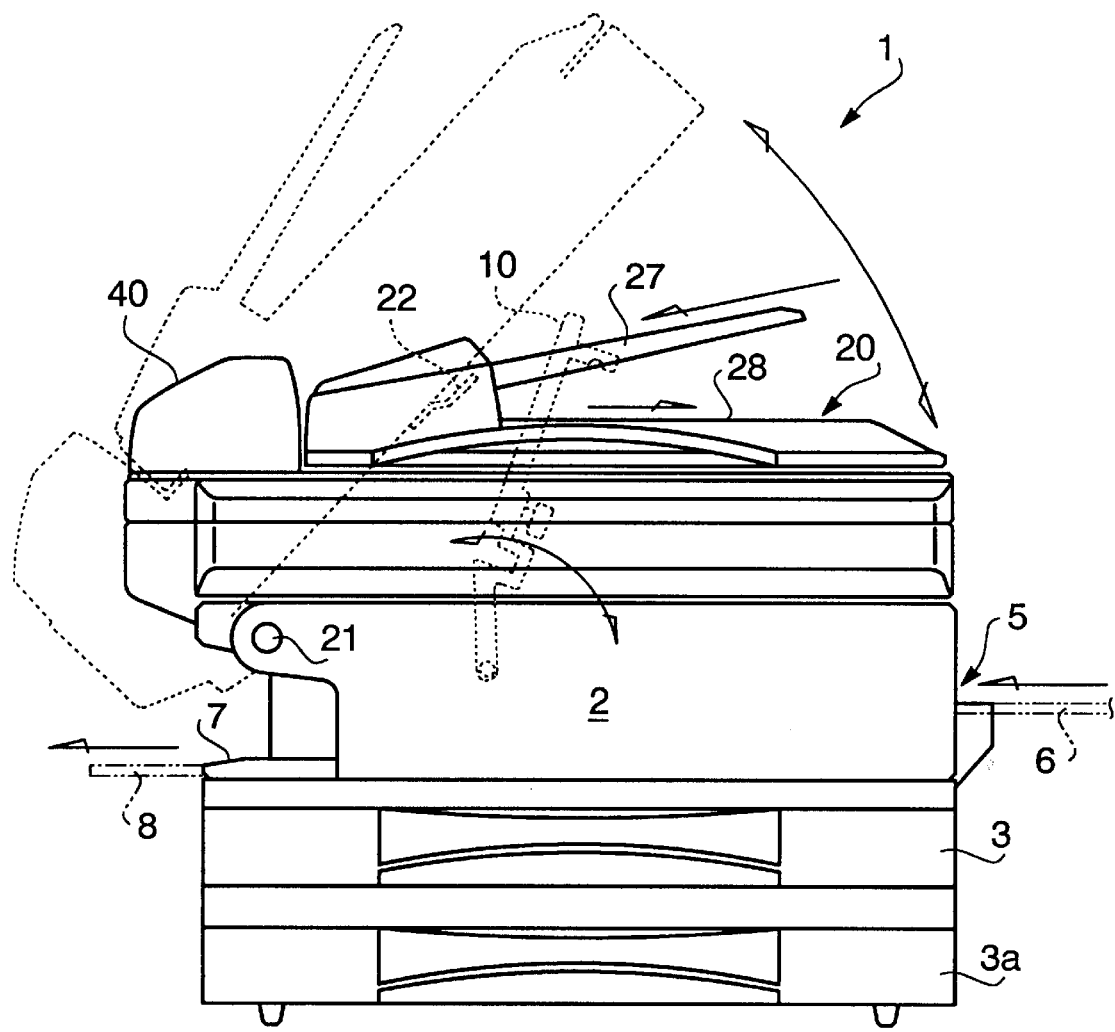
FIG. 1 is a front view of a facsimile device of the present invention.
Figure 2:
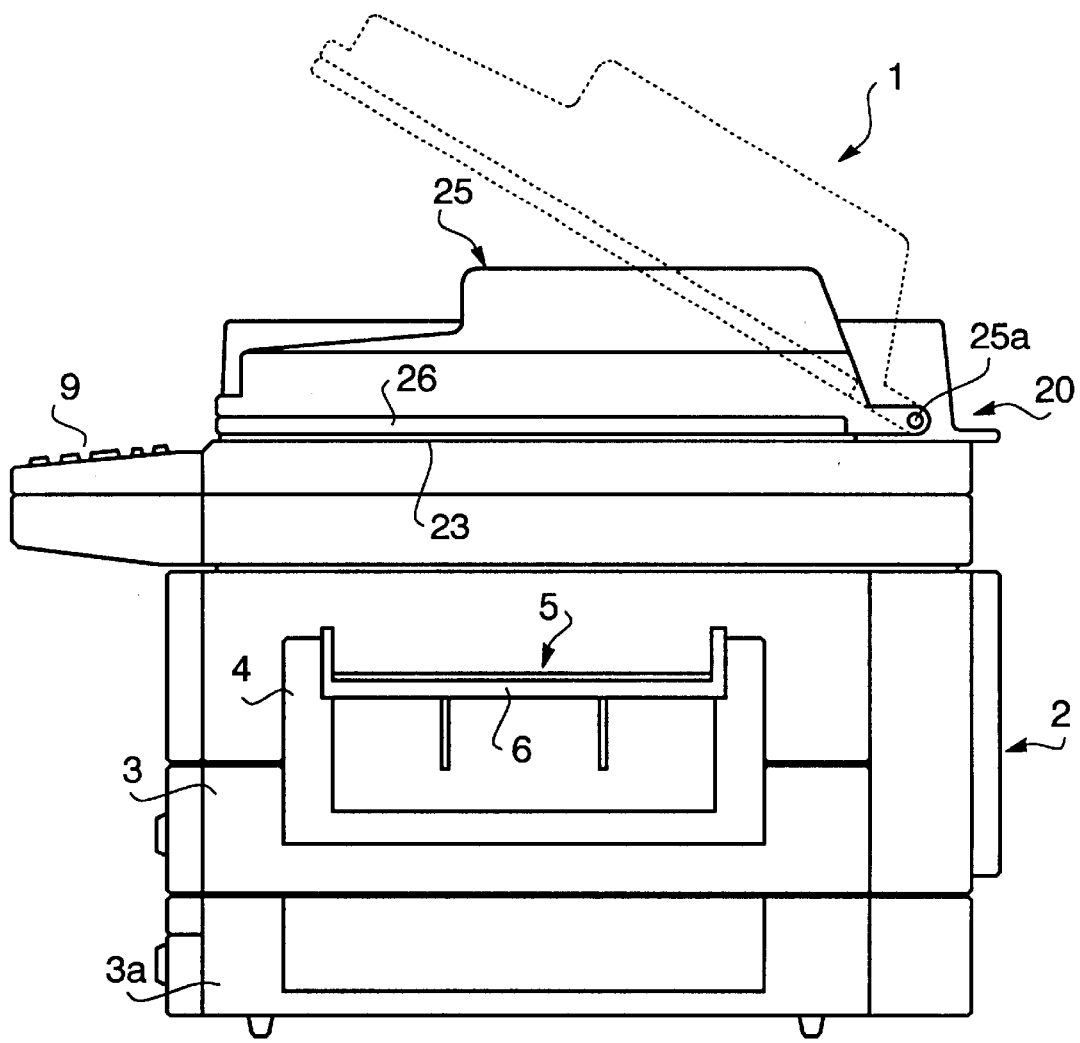
FIG. 2 is a side view of the facsimile device of FIG. 1.
Figure 3:
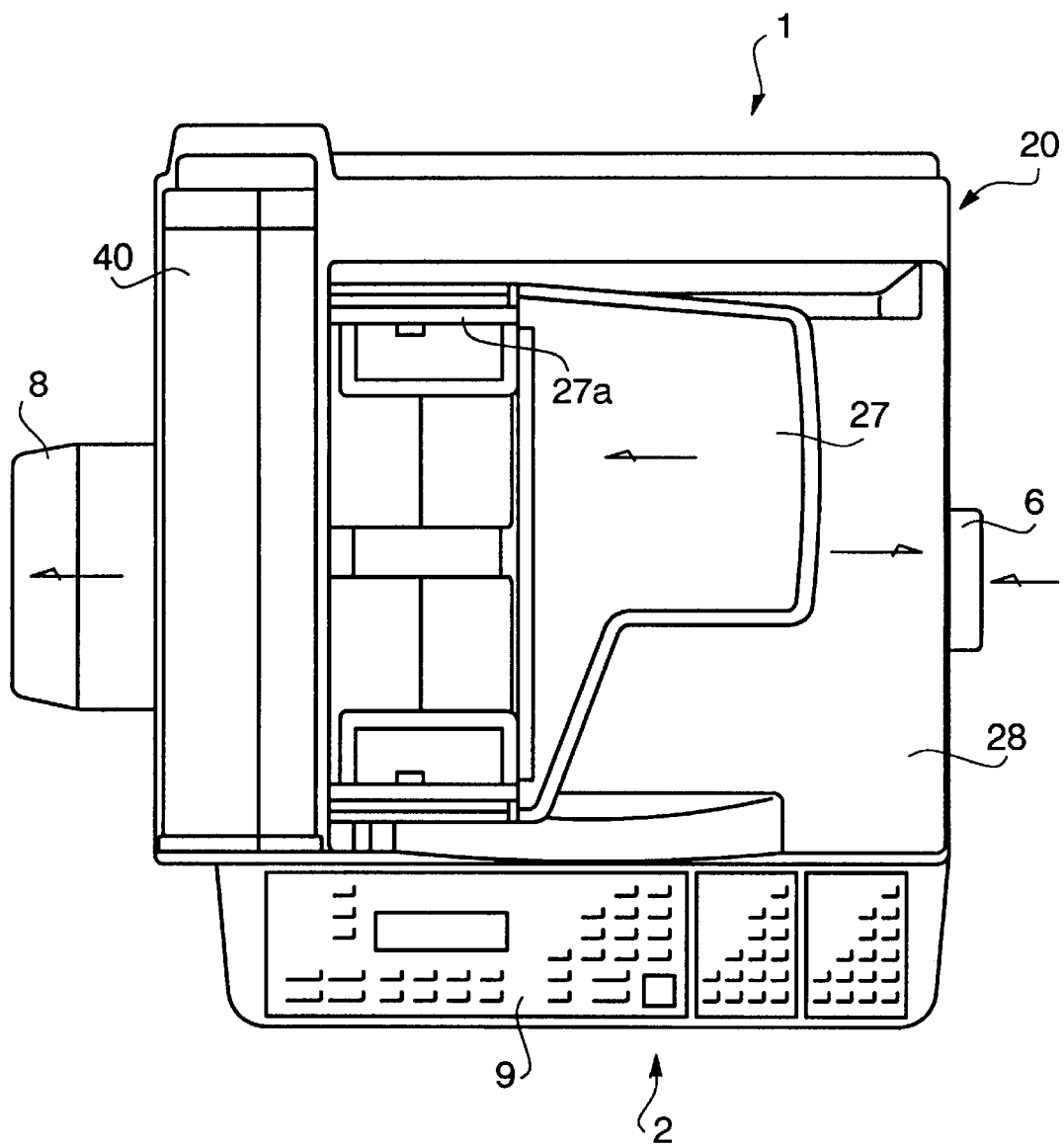
FIG. 3 is a plan view of the facsimile device of FIG. 1.

As shown in FIGS. 1–3, a facsimile device 1 includes two paper feed cassettes 3, 3a arranged in its lower part, a main body frame 2 having an electrophotographic recording part arranged above the paper feed cassettes 3, 3a, and a scan part frame 20 provided on the main body frame 2 such that it can rotate around a fulcrum axis 21 along a side of the main body frame 2. The scan part frame 20 includes a scanner device as FBS for scanning a book-shaped document being set on a platen arranged on the upper surface of the scan part frame 20, and a moving document scan part for carrying out the operation as ADF by scanning a document moving from a document tray 27 to a document discharge (feed) tray 28 through a document feed part 40 (the upper surface of a platen cover is used as the document feed tray 28).

The paper feed cassettes 3, 3a arranged under the main body frame 2 are designed such that they can accommodate paper of a variety of size and can be with drawn from the front side of the facsimile device. In addition, as shown in FIG. 2, an manual paper feed opening 5 is formed on another side of the main body frame such that a manual paper feed tray 6 can be attached to it. The manual paper feed tray 6 is convenient when photocopying is to be done using paper of special sizes or using a few number of sheets of paper for which using the paper feed cassettes 3a, 3a would be troublesome. The manual paper feed tray 6 is designed such that when it is removed, no unnecessary structure projects out from the main body frame 2. Further, as shown in FIG. 1 and FIG. 3, a paper discharge tray 7 for receiving discharged paper is arranged on yet another side of the main body frame 2 such that it can be further extended by withdrawing an assistant tray 8 when paper of a large size is to be received. The paper discharge tray 7, when its assistant tray 8 is not withdrawn, does not project out beyond the end of the scan part frame 20 right above it and thus discharged paper sheets are received in a state in which they slightly project out from the paper discharge tray 7.

As shown in FIG. 3, a control panel 9 for commanding operations of the facsimile device is arranged on the front side of the main body frame 2, similar to other facsimile devices. The scan part frame 20 arranged on the upper surface of the main body frame 2 includes the document feed (discharge) tray 28 being the upper surface of the platen cover and the document tray 27 provided above the document feed tray 28. The document tray 27 and the document feed tray 28 are designed such that the document can be fed from the document tray 27 to the document feed tray 28 through the document feed part 40. In addition, a side guide 27a is movably provided on the document tray 27 such that the document of variety of sizes can beach aligned against the document feed part 40 when it is set on the document tray 27.

In the facsimile device 1, as shown in the phantom line in FIG. 1, the scan part frame 20 is designed such that it can rotate around a fulcrum axis 21 located along a side of the main frame body 2. Therefore, when the scan part frame 20 is rotated (opened), the upper surface of the main body frame 2 is exposed free. In that state, an electrophotographic process unit can be made exposed if an intermediate cover 10 provided in the upper portion of the main body frame 2 is opened. The structure of the process unit and the mechanism of removal from/attachment to the main body frame 2 of the process unit will be described in details below. In addition, as shown in FIG. 2, an upper open/close frame 25 having the platen cover and the document tray 27 and the like is provided on the scan part frame 20 such that it can rotate around a fulcrum axis 25a located on the rear side of the facsimile device 1. By opening the upper open/close frame 25, the platen for setting a book-shaped document can be exposed (in this case the document feed part 40 is not used for document feeding).

According to the aforementioned structure of each member and the frame opening/closing mechanism, in the facsimile device of the present invention, the facsimile device control operation and the paper supply operation to the paper feed cassettes 3, 3a can be performed from the front side of the device 1, and the paper feed operation using the manual paper feed tray 6 and the pick-up operation of the discharged photocopies can be performed on the two sides of the device 1. In addition, the upper surface of the main body frame 2 can be exposed by opening (rotating) the scan part frame 20 such that maintenance for the process unit of the image recording part can be performed as desired. Further, a book-shaped document can be set on the platen by opening the upper open/close frame 25 provided on the scan part frame 20. That is, scanning of the book-shaped document set on the platen and transmission of the scanned image information can easily be carried out.

Figure 4:
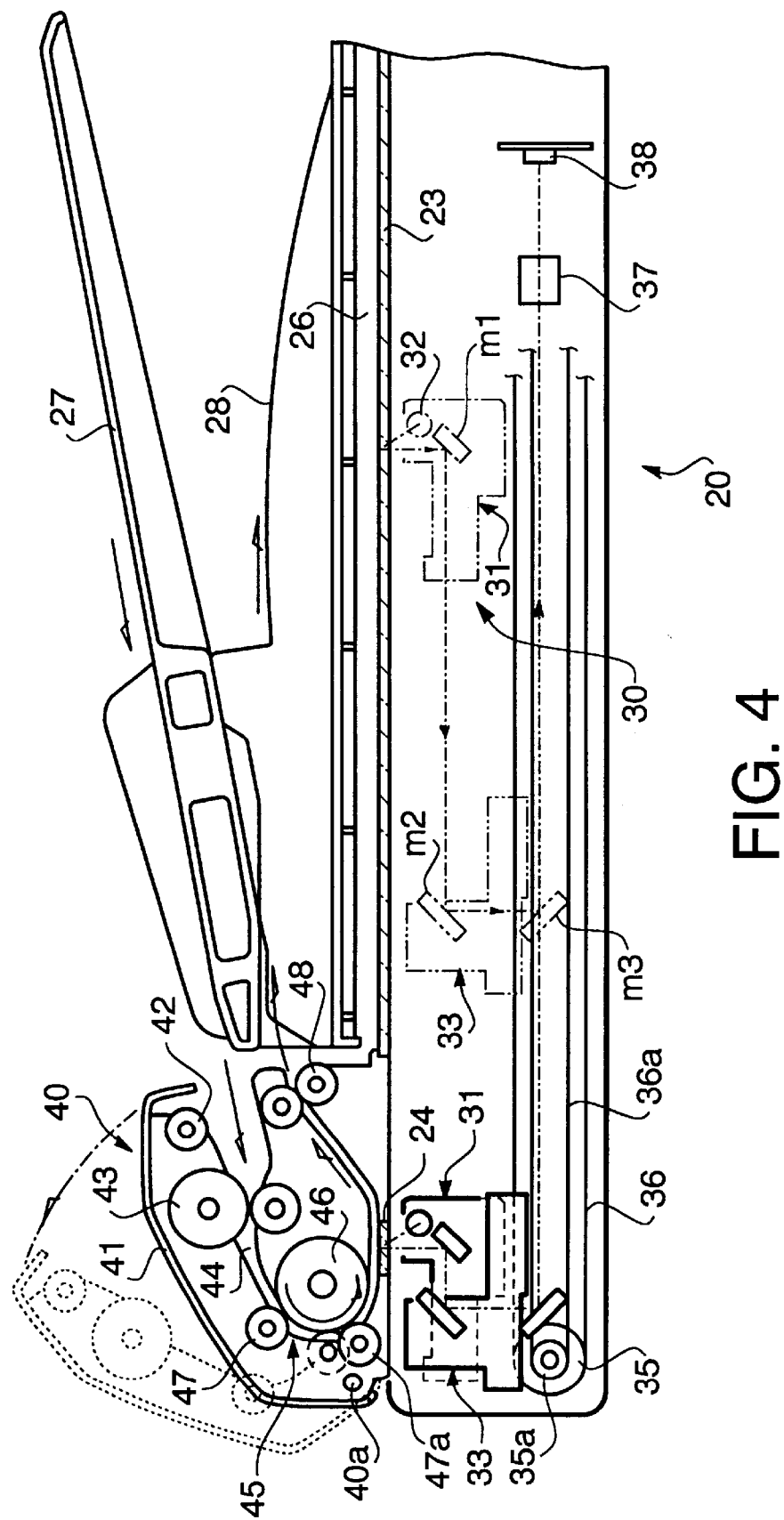
FIG. 4 is an explanatory diagram showing a structure of a mechanism arranged in a scan part frame.

In the facsimile device 1 having the aforementioned structure, a scan device 30 structured as shown in FIG. 4 is provided in the scan part frame 20 arranged in the upper portion of the main body frame 2. Similar to other scan devices used for facsimile devices in general, the scan device 30 includes a full rate carriage 31 having a lump 32 and a mirror m1 and a half rate carriage 33 having mirrors m2, m3 arranged to face each other. The full rate carriage 31 and the half rate carriage 33 are arranged in combination such that the scanned information of the document is transmitted to CCD 38 through a lens device 37 and then the light signals are converted into electric signals to send them to the image information processor located in the main body frame 2. In the present embodiment, a mechanism is provided for driving the full rate carriage 31 and the half rate carriage 33 in which mechanism drive pulleys 35, 35a (their radius ratio is set to be 2: 1) are coaxially arranged such that each pulley moves the corresponding carriage by way of a belt 36, 36a taken on it. Due to this mechanism, the two carriages are moved in association with each other.

In the upper part of the scan part frame 20, a platen 23 adapted for the operation of FBS and another platen 24 adapted for ADF operation are provided (the platen 24 is located under the document feed part 40). When the platen 23 is to be used, the upper open/close frame 25 is opened and a document is set on the platen 23. Then the upper open/close frame 25 is closed, making the platen cover 26 push the image surface of the document on the upper surface of the platen 23. Once the document is set in the desired position,the scan operation of the document is performed. More specifically, the full rate carriage 31 of the scan device 30 is reciprocally moved in the scanning direction within the document length (the document is set on the platen 23) according to the information detected by a sensor (not shown). On the other hand, the half rate carriage 33 travels at a velocity that is a half of the velocity of the full rate carriage 31 with reading the image information and outputs the image signals by way of CCD 38.

When a document sheet is scanned using the document tray 27, the document is fed to the document feed part 40 as ADF (automatic document feeder) by way of the U-shaped feed path 44 and the image is read with the scan device (the scan device is fixed on the platen 24).

The U-shaped feed path 44 formed in the document feed part 40 is provided with a pick-up roller 42 at the document insertion portion, a paper handling device 43 and a feed roller device 45 for feeding a document inside the U-shaped feed path. The feed roller 45 includes a drive roller 46 of a large diameter and two pinch roller 47, 47a. The drive roller 46 forms the guide surface for the inner surface of the document when the document makes a turn. The platen 24 is located on the downstream side of the pinch roller 47a. In addition, a discharge roller 48 is provided at the end portion of the U-shaped feed path 44 such that the document of which scanning is complete can be discharged toward the discharge tray 28.

The document feed part 40 includes an open/close frame 41. The open/close frame 41 is provided such that it can rotate around a fulcrum axis 40a. The open/close frame 41 has a paper guide integrally provided on the outer side of the U-shaped feed path 44. The open/close frame 41 is also provided with the pick-up roller 42, a roller of the paper handling device 43, and the pinch roller 47, 47a. In addition, the open/close frame 41 is arranged such that jammed paper can be dealt with by opening the frame 41 and thus exposing the U-shaped feed path 44.

Further, if a frame constituted of a guide plate and the drive roller 46 and one of the rollers of the discharge roller device 48 is provided such that it can rotate against the lower frame of the document feed part 40, maintenance such as cleaning the platen 24 becomes easier.

When a document is set on the document tray 27 and scanned by using the document feed part 40, detection means (not shown) detects that the document has been set in the document tray 27 and sends detection signals to the controller (the control panel) to operate it. This operation may be carried out by inputting to the control panel a command that a scan operation is to be performed using the document feed part 40. Then, the full rate carriage 31 of the scan device 30 is stopped at a position corresponding to the platen 24 and the half rate carriage 33 is moved to the left end of the scan part frame 30. Next, the document sheets are fed from the document tray 27 one (sheet) by one through the U-shaped feed path 44 to scan the image of each document sheet when it passes on the platen. Accordingly, in the scan device arranged in the scan part frame 20, document scanning can be carried out as desired by setting the scan device for either the platen 23 or the platen 24, to transmit the scanned image information utilizing the transmission function of the facsimile device.

Figure 5:
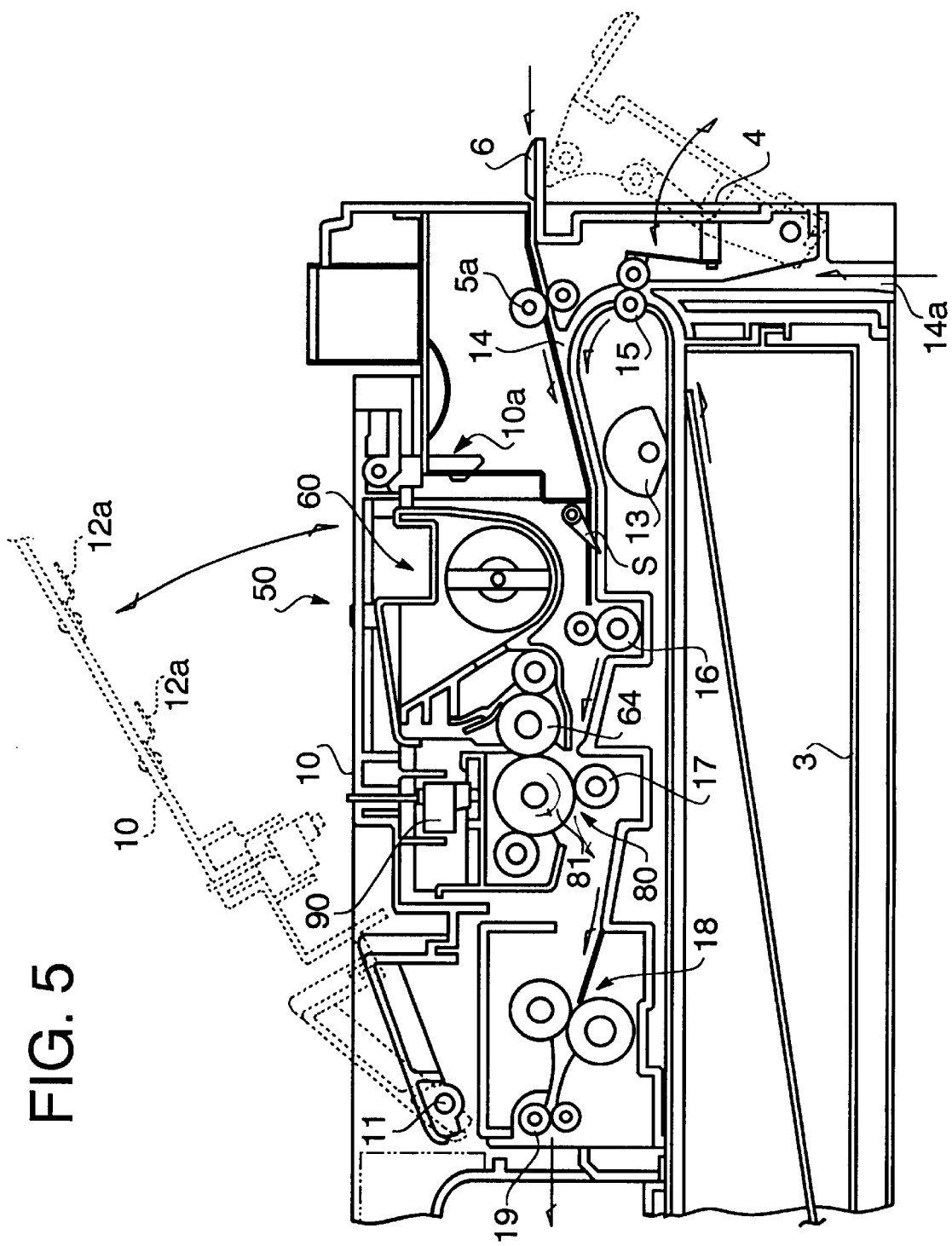
FIG. 5 is an explanatory diagram showing a structure of a mechanism arranged in a main body frame.

As shown in FIG. 5, the main body frame 2 arranged under the document feed part 40 includes an electrophotographic process unit 50 and a paper feed mechanism that comprises the paper feed cassettes, the paper discharge tray and the like. The process unit 50 includes a development unit 60 and a photosensitive unit 80 that are to be arranged in combination. More specifically, a photosensitive drum 81 provided in the photosensitive unit 80 is arranged for a development roller 64 of the development unit 60 and a transfer roller 17 is provided under the photosensitive drum 81. As described below, the two units 60, 80 constituting the process unit (device) 50 are provided such that they are integrally combined and can be removed from/attached to the main body frame 2 all together. The process unit 50 is fixedly held at its operational position when the intermediate cover 10 is closed.

Paper in the paper feed cassette 3 located under the process unit 50 of the main body frame 2 is fed one (sheet) by one by a paper feed roller 13 provided on the paper feeding side and is fed by way of the paper feed path 14 and the image transfer part to a fixing device 18. The paper is then discharged from the discharge tray 8 by way of the discharge roller device 19. The paper feed path 14 is provided with a feed roller device 15 and a resist roller device 16. When the top end of a sheet is nipped by the feed roller device 15, the feeding operation by the paper feed roller 13 is interrupted and the sheet is fed by the feed roller device 15. The top end of the sheet is then stopped by the resist roller device 16. After that, the resist roller device 16 is driven according to the timing of toner image formed on the photosensitive drum 81 to transfer the toner image on the sheet by the transfer roller 17. The sheet on which the toner image has been transferred is guided to the rollers of the fixing device (precisely, between the rollers of the fixing device) by the paper feed operation of the photosensitive drum. The toner image on the sheet is then fixed when the sheet passes through between a heat roller and a pressure roller. After the fixation, the sheet (a photocopy) is discharged to the discharge tray 8 by the discharge roller device 19.

The facsimile device in FIG. 1 has two paper feed cassettes as shown, and paper is fed from the lower paper feed cassette 3a (located under the paper feed cassette 3) to the paper feed path by way of the paper feed path 14a. When paper is fed by way of the manual paper feed tray 6 provided at the manual paper feed opening 5, the paper is sent from the tray 6 to the resist roller 16 by way of a roller device 5a for manual paper feeding and the image is transferred. The paper feed path in the longitudinal direction of the main body frame is provided with means for exposing this paper feed path by opening a side plate 4. That is, by opening the side plate 4 much wider than the state shown in the phantom line in FIG. 4, jammed paper or the like can be dealt with within the paper feed path in the longitudinal direction. The main body frame 2 is provided with a lock mechanism and detection means for the side plate 4 such that paper feeding is carried out only during the side plate is closed.

In the process unit 50 arranged above the horizontal portion of the paper feed path 14, the development unit 60 and the photosensitive unit 80 are arranged in combination as described above. A writing unit 90 for carrying out image writing (on the photosensitive drum 81) when the intermediate cover 10 is closed is provided above the photosensitive drum 81 of the photosensitive unit 80. In addition, springs 12, 12a for pushing the development unit 60 is provided under the intermediate cover 10 such that each unit 80, 90 is fixedly held at the correct operational position by way of a lock member 10a when the intermediate cover 10 is closed. In addition, when the scan part frame 20 is closed as shown in FIG. 1 without correctly closing or locking the intermediate cover 10, the intermediate cover 10 is pushed by the springs 22 provided on the lower surface of the scan part frame 20 such that the intermediate cover 10 is pushed to a position at which it is closed and firmly fixed by the lock member 10a.

Figure 6:
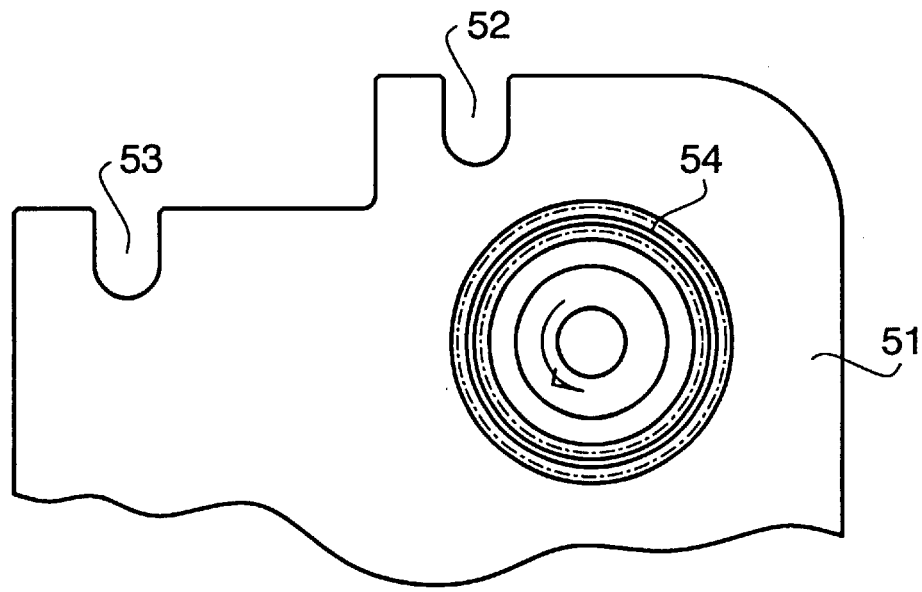
FIG. 6 is an explanatory diagram of a plate frame for supporting a process unit (device).

The development unit 60 and the photosensitive unit 80 arranged in the process unit 50 are mounted on the main body frame 2 by way of a plate frame 51 shown in FIG. 6. The plate frame 51 is provided with a pin-reception groove 52 for receiving the development unit 60 and a pin reception groove 53 for receiving the photosensitive unit 80. The plate frame 51 is provided on each side of the mounting portion of the process unit 50. More specifically, the plate frame 51 provided on the rear side of the main body frame 2 has a drive gear 54 for a rotation member like rollers of the development unit 60. The drive gear 54 transmits the drive force for each roller device of the development unit 60 when the development unit 60 is set on the plate frame 51.

Figure 7:
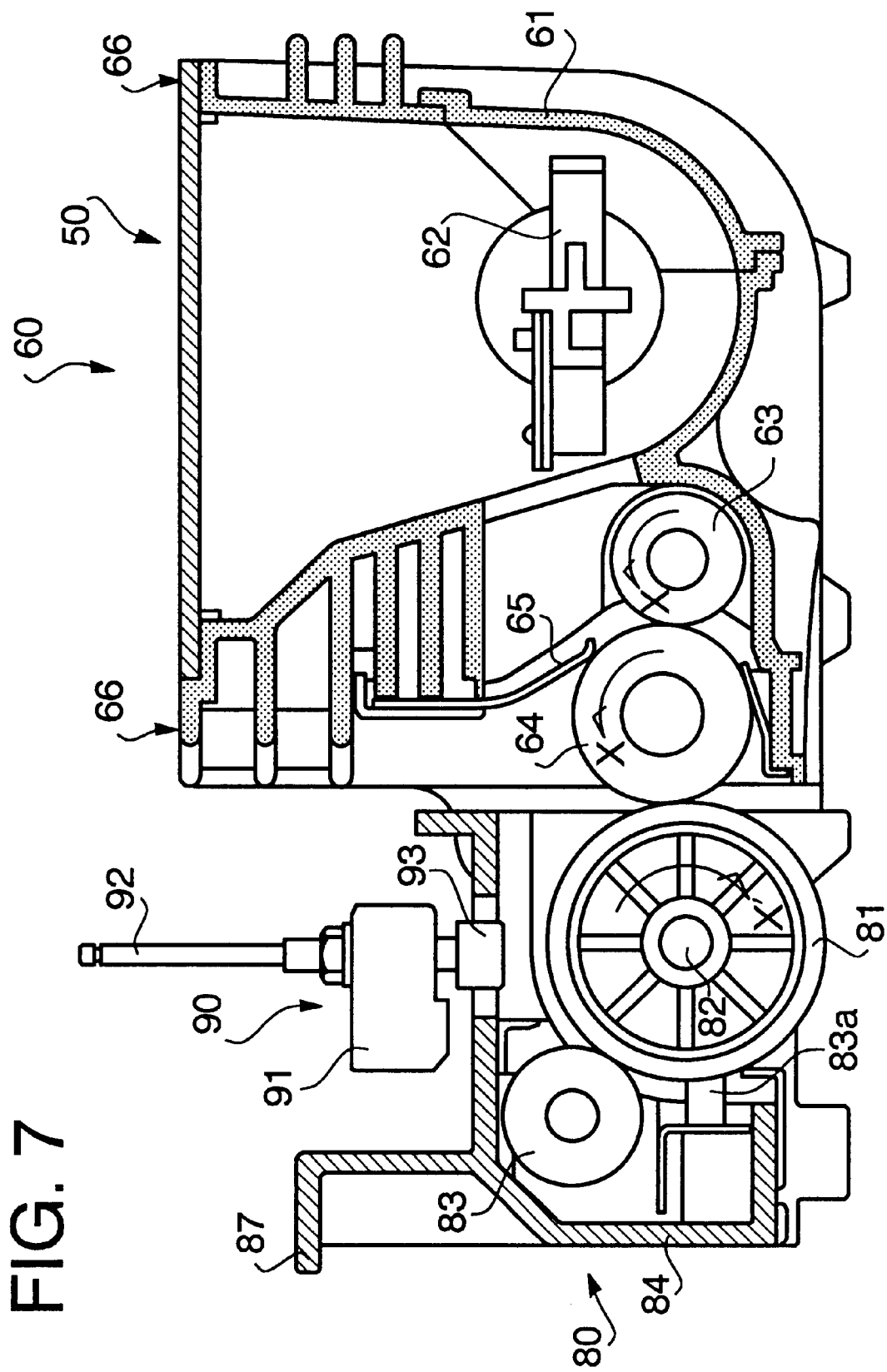
FIG. 7 is an explanatory diagram of the process unit.

FIG. 7 shows the two units 60, 80 of the process unit 50 in the combined state in which the two units 60, 80 can be aligningly connected to the plate frame 51 mounted in the main body frame 2 of the image recording device. More specifically, when the two units 60, 80 are to be combined, the development unit 60 is at first attached to the main body frame and then the photosensitive unit 80 is aligningly attached to both the main body frame 2 and the support bodies formed in the development unit 60. The combined two units 60, 80 can be "as a whole" removed from/attached to the process unit attachment part of the main body frame 2. Then the intermediate cover 10 is closed such that the writing unit 90 can be aligned against the photosensitive unit 81.

Figure 9:
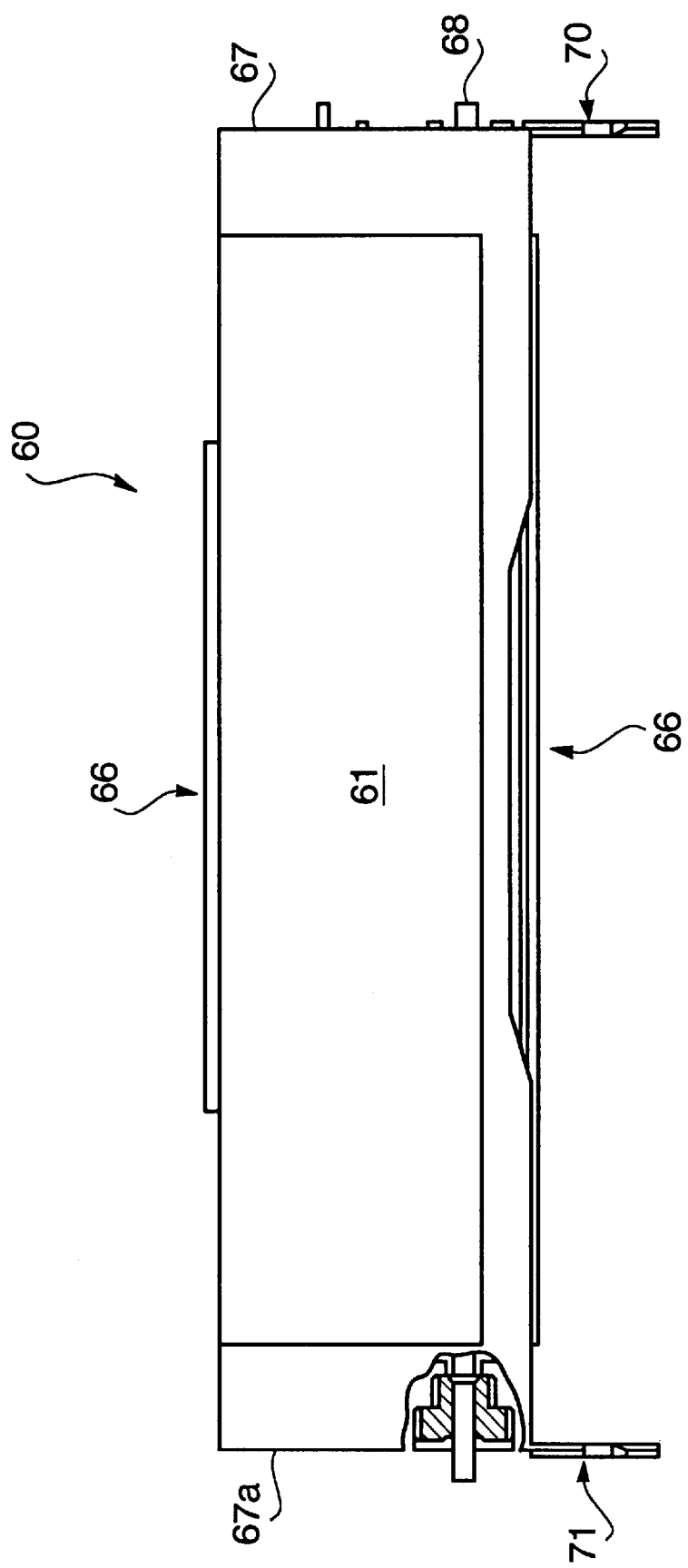
FIG. 9 is a plan view of the development unit of FIG. 8.

In the example shown in FIG. 7 or FIG. 9, a container 61 for containing non-magnetic and one-component toner for the development unit 60 is provided with a stirring member 62 for supplying the toner with stirring to a supply roller 63. The supply roller 63, a development roller 64 adjacent to the photosensitive drum 81 and a layer thickness control member 65 adjacent to the development roller 64 are provided at the toner discharge portion of the container 61. The stirring member 62 may be designed as a stick-shaped member or a member having a vane or any other suitable members as long as it can supply the toner with stirring to the supply roller 63. Further, the supply roller 63 can be designed as a resilient roller of which axis is provided with a sponge-like conductive resilient material or hairy material having conductive hair (the resilient or hairy material is required to have a predetermined thickness). A bias voltage about −600 to −700 V (desirably about −650 V) is applied to the axis of the supply roller 63 from an electricity supply source (not shown).

The development roller 64 is designed as a roller of which metallic roller axis (made of stainless or the like) is covered with conductive rubber (silicon rubber, urethane rubber, NBR) of a predetermined thickness. The surface of the development roller 64 is to be made sufficiently smooth. A bias voltage about −300 to −400 V (desirably about −350 V) is applied to the development roller 64. The layer thickness control member 65 is to keep the thickness of the thin toner layer formed on the surface of the development roller 64 uniform. The layer thickness control member 65 may be designed as a plate member made of urethane resin sheet or stainless having a spring-like resilience. A bias voltage about −600 to −700 V (desirably about −650 V) is applied to the layer thickness control member 65.

The distance between the axis of the supply roller 63 and that of the development roller 64 is set to be slightly smaller than the sum of the radiuses of the two rollers 63, 64. When both rollers 63, 64 are rotated in the same direction (indicated by an arrow X in FIG. 7), each roller 63, 64 is moved (slid) in the opposite direction to each other at the press-contact area of the two rollers 63, 64. Due to the friction effects and the applied voltage difference between each roller 63, 64, toner is charged with electricity between the two rollers and the toner is transferred to the surface of the development roller 64. The toner attached to the surface of the development roller 64 is made its layer thickness uniform by the layer thickness control member 65. Then, the development roller 64 is exposed to the photosensitive drum 81 such that the toner is transferred to the latent image formed on the photosensitive drum to form the toner image (on the drum).

Figure 10:
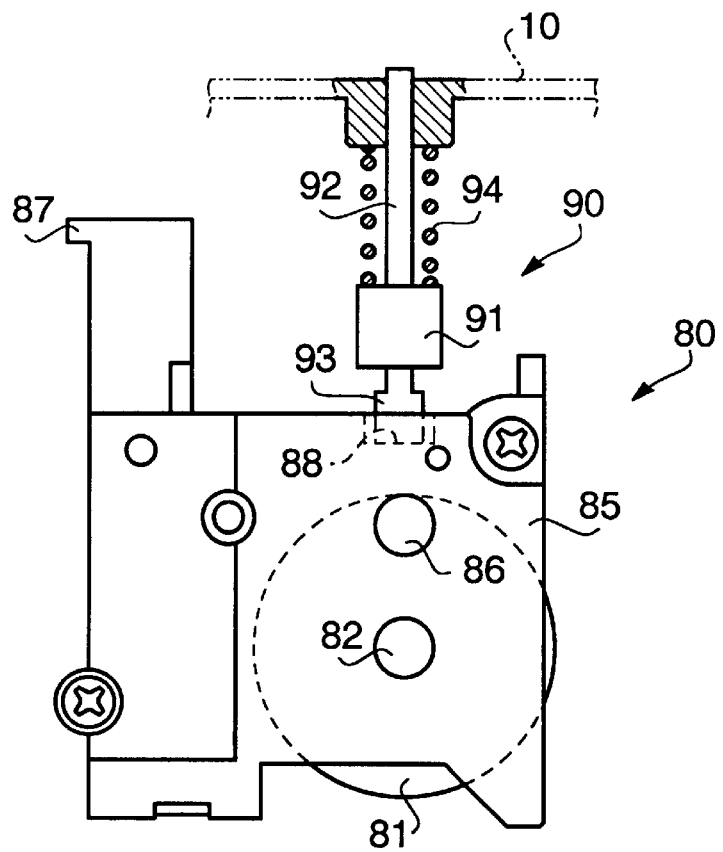
FIG. 10 is an explanatory diagram showing the relationship between the structure of a photosensitive unit and a writing unit.
Figure 11:
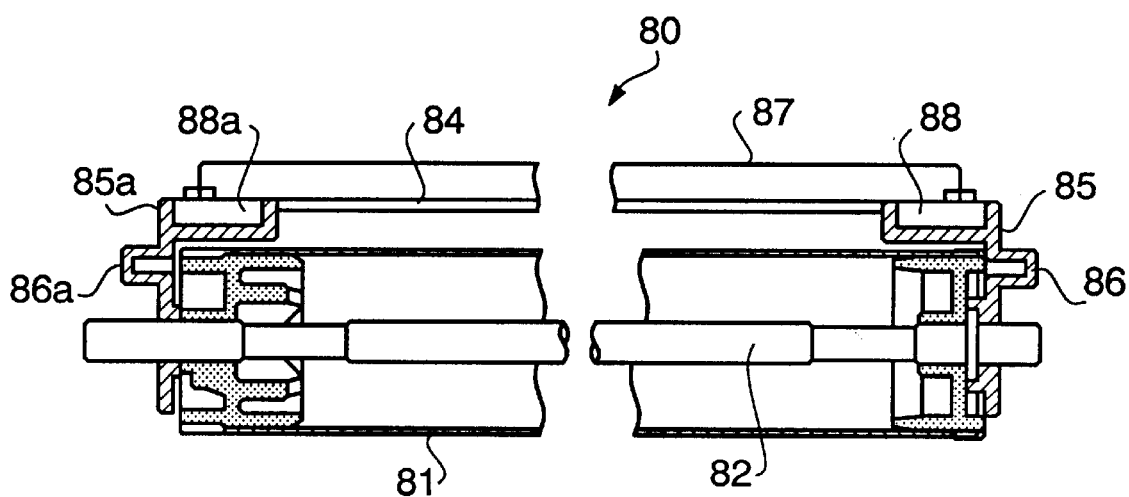
FIG. 11 is a vertically sectioned front view of a photosensitive unit.

The photosensitive unit 80 is arranged in combination with the development unit 60 as shown in FIG. 10 and FIG. 11. As described in details below, the photosensitive unit 80 has a photosensitive drum 81 and a charger 83. The charger 83 may be designed as a brush roller of which surface is covered with planted hair. The writing unit 90 is positioned with the surface of photosensitive drum 81 such that image can be written on the photosensitive drum 81 by the writing unit 90. Then, the toner image formed on the photosensitive drum can be transferred onto paper by the application of the voltage from the transfer roller 17.

The writing unit 90 may be designed as LED head array and illuminates light on the photosensitive drum 81 by making LED emit light according to the information from the image information output device. The surface of the photosensitive drum 81 is made of an earthed photoconductive material. When charged at −780 V by the charger 83, the electric potential of the portions of the photosensitive drum 81 onto which the light has been illuminated by the writing unit 90 (that is, the portions corresponding to the black area in the image information) drops below −80 V, and the generated electric potential difference between the illuminated portions and the non-illuminated portions (corresponding to the white area in the image information) forms the electrostatic latent image corresponding to the image information.

When the toner attached on the surface of the development roller 64 and charged approximately −680 V is made contact with the electrostatic latent image formed on the photosensitive drum 81, the toner is attracted onto the illuminated portions of the photosensitive drum 81 surface to form the toner image on the surface of the photosensitive drum 81 (the reversal development). The toner image is then at its transfer position transferred onto paper by the application of a bias voltage about 800 V to 2 kV from the reverse side of the paper by the transfer roller 17. The paper onto which the toner image has been transferred is sent to the fixing device 18 by the rotation of the photosensitive drum 81. On the other hand, the toner still remaining on the surface of the photosensitive drum 81 after the image transfer is scattered by the memory erasure brush 83a (this brush 83a is provided such that it can slidably contact with the photosensitive drum 81 surface and a voltage can be applied on it) all over the surface of the photosensitive drum 81 and the scattered toner is charged by the charger 83 at the same electric potential as that on the photosensitive drum 81 surface. Then, the toner is transferred onto the development roller 64 due to the electric potential difference between the photosensitive drum 81 and the development roller 64 at the position where the drum 81 contacts with the development roller 64. The toner transferred onto the development roller 64 is mixed with new toner supplied from the container 61 and used again.

Figure 8:
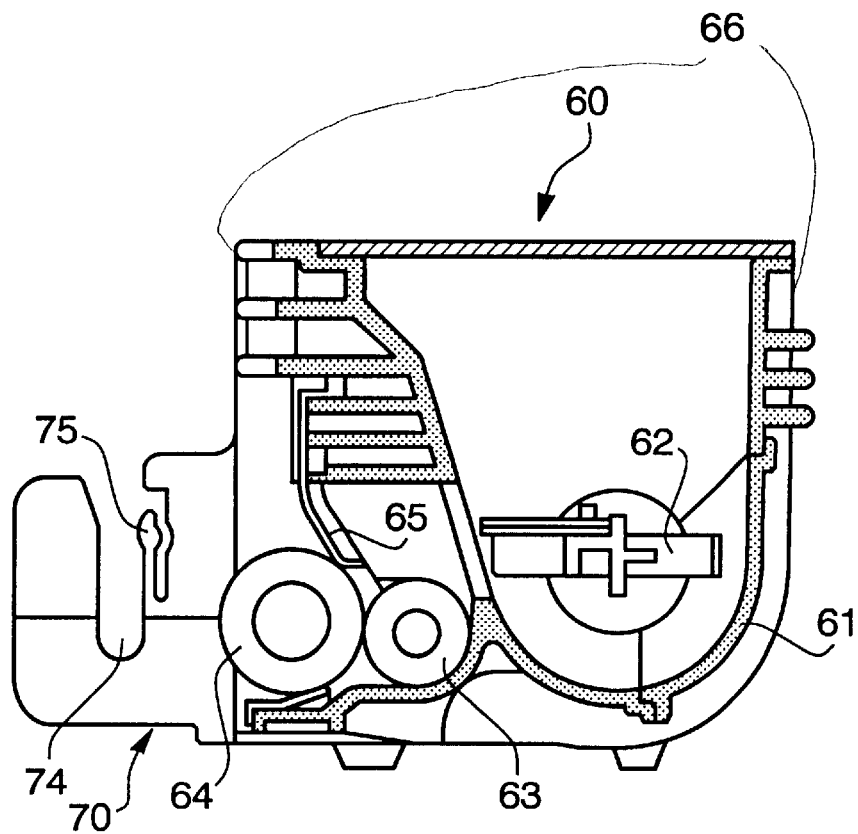
FIG. 8 is an explanatory diagram showing a structure of a development unit.

In the development unit 60 shown in FIGS. 7 to 9, handle members 66 that also function as reinforcement ribs are provided above the container 61 (the container 61 contains toner and has the stirring member 62 adjacent to it) on the upstream side and the downstream side in the paper feed direction (that is, the left side and the right side in FIG. 7). The frame member including the container 61 of the development unit 60 is made from a plastic material by injection molding or the like and the handle members are integrally molded with this frame member. In addition, side frames 67, 67a arranged as the side portions of the frame member has outwardly projecting support pins 68, 68a such that the development unit 60 can be aligned against and mounted to the plate frame 51 (the plate frame 51 is arranged in the image recording device) by way of these support pins 68, 68a.

The development unit 60 has support bodies 70, 71 that are provided integral with the frame and project to the downstream side in the paper feed direction when the development unit 60 is attached to the image recording device. The paired support bodies are arranged such that they extend from the side portions 67 of the development unit 60. The support bodies also have engagement grooves 74 for accommodating the drum shafts and the like of the photosensitive unit 80 and hook members 75 for holding the accommodated shafts and the like in the engagement grooves 74 respectively as described below. The opposing inner sides 72, 73 of the support bodies 70, 71 are formed to be tapered such that they function as the guide surfaces when the photosensitive unit 80 is attached to the development unit 60. The operation required when the photosensitive unit 80 is attached to the development unit 60 will be described in details below.

The photosensitive unit 80 shown in FIG. 10 (a sided view) and FIG. 11 (a vertically sectioned front view) is arranged such that it can be attached to the image forming part of the image recording device in combination with the development unit 60. The main frame 84 made from a plastic material is integrally connected to side frames 85, 85a. A drum shaft 82 (and thus the photosensitive drum 81) is arranged in the side frames 85, 85a by way of bearing members. The end portions of the drum shaft 82 outwardly extend from the side frames 85, 85a on both sides and pin members 86, 86a also project from the side frames 85, 85a. Each pin member 86, 86a is located vertically above its associated end portion of the drum shaft 82. The end portions of the drum shaft 82 and the pin members 86, 86a form alignment means for aligning the photosensitive unit 80 against the development unit 60 and the image recording device. In addition, a handle member 87 is provided in the upper part of the main frame 84 such that it can be used as a handling member when the photosensitive unit 80 is removed/attached.

The photosensitive unit 80 is provided with a groove 88, 88a formed near to each end of the upper surface of the main frame 84 such that the writing unit 90 can be aligned against the photosensitive unit 80. When the writing unit 90 is attached to the photosensitive unit 80, as shown in FIG. 10, pushing members 93 provided on the both sides of the writing unit 90 are pushed into the grooves 88, 88a and the distance between the photosensitive drum 81 and the light output window of LED can be fixed at a predetermined value. More specifically, the downwardly-projecting pushing members 93 are provided on the both sides of the main body part 91 that accommodates LED of the writing unit 90 (the writing unit 90 is held by the intermediate cover 10 in its upper portion 92). The main body part 91 is biased by a spring 94 along the upper portion 92 such that the writing unit 90 can be aligned against the main frame 84 of the photosensitive unit 80 by way of the pushing members 93. In short, by providing the alignment means for aligning the writing unit 90 against the photosensitive unit 80 as described above, the light output window of the writing unit 90 can be correctly aligned against the photosensitive drum and the distance between the photosensitive drum and the LED can be reliably maintained at a predetermined value.

Figure 12:
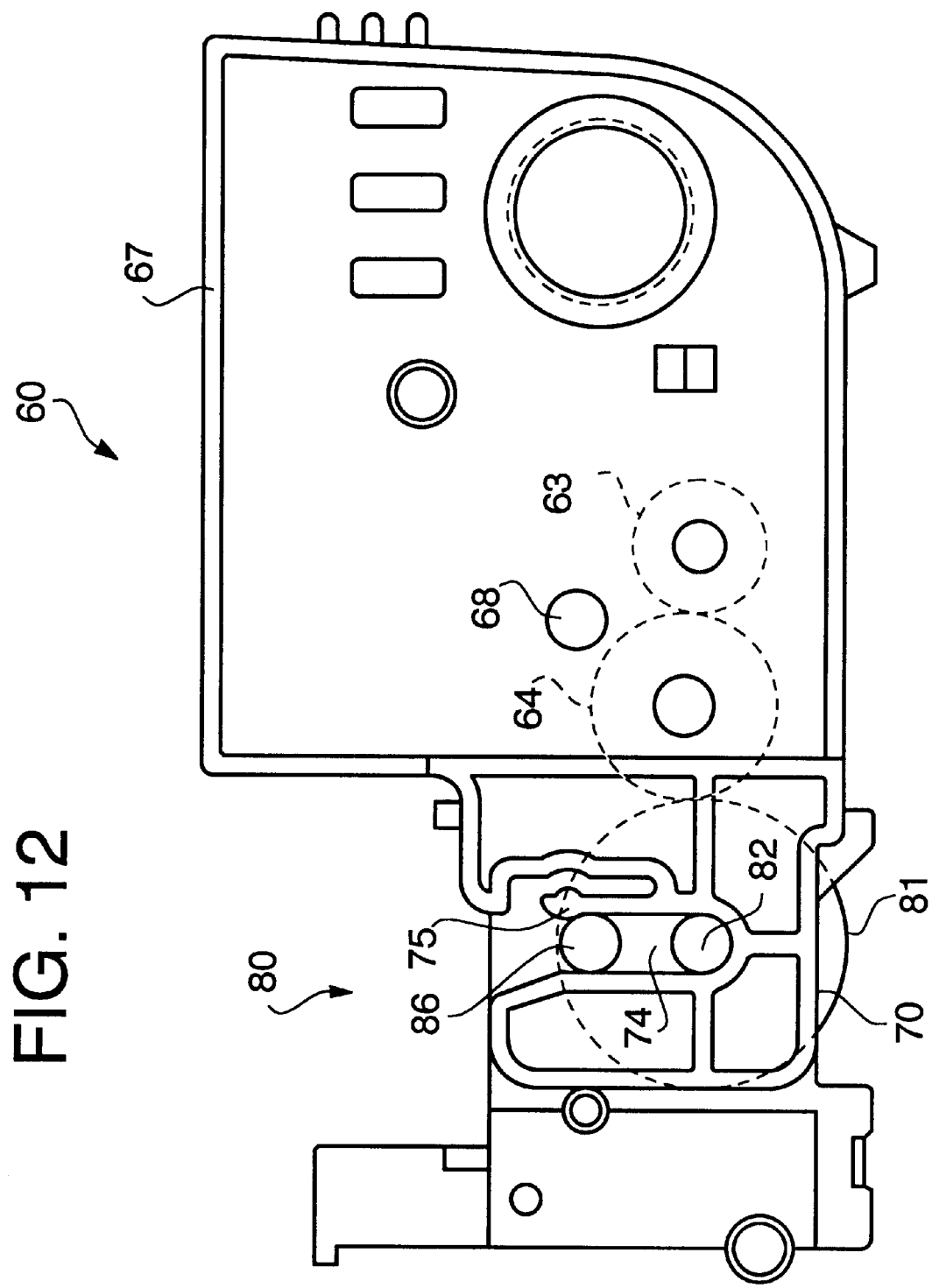
FIG. 12 is an explanatory diagram showing the development unit and the photosensitive unit in their combined state.
Figure 13:
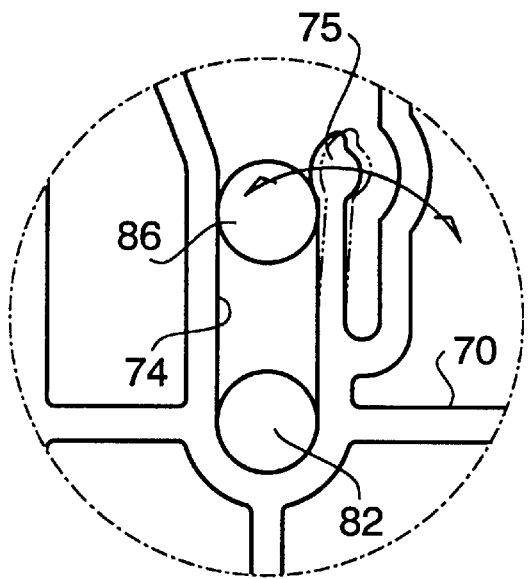
FIG. 13 is an explanatory diagram showing members for fixing the photosensitive unit onto the development unit.
Figure 14:
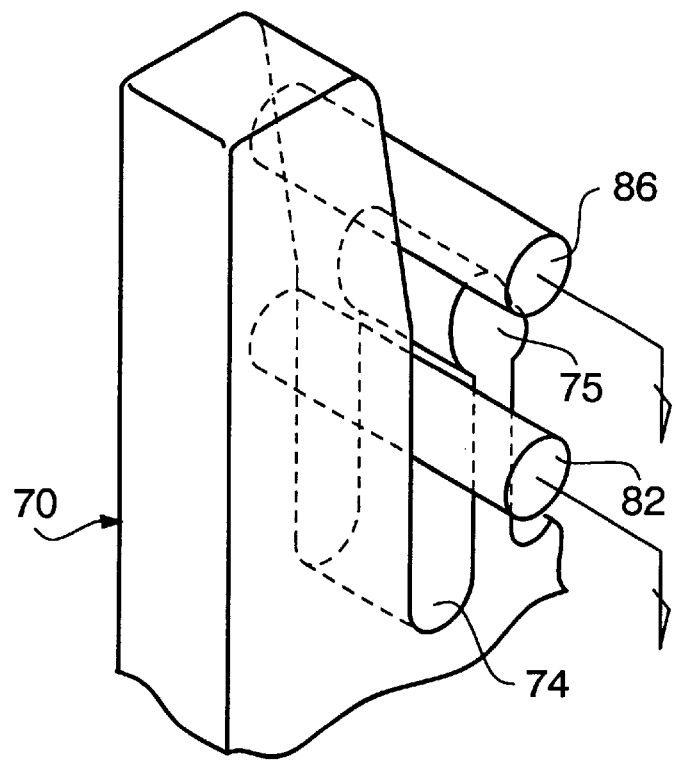
FIG. 14 is an perspective view of the members shown in FIG. 13.

Now, the two units 60, 80 in a state where both are attached to the image recording device will be described with reference to FIGS. 12–14. In this state, as shown in FIG. 12, the photosensitive unit 80 is attached to the support bodies 70, 71 of the development unit 60. As shown in FIG. 13 (a side view) and FIG. 14 (a perspective view), the pin members 86 and the end portions of the drum shaft 82 projecting in the width direction on both sides of the photosensitive unit 80 are inserted into the engagement grooves 74 formed in the support bodies 70 of the development unit 60. Since the hook member 75 pushingly holds the pin member 86 due to their spring-like resilience, the photosensitive drum 81 can be held in a stable relationship with the development roller 64 of the development unit 60, and the two units 60, 80 in the combined state can be removed from/attached to the process unit attachment part as shown in FIG. 12 by gripping the handle member of the development unit 60 and lifting it up. Therefore, if paper jam or the like occurs in the paper feed path of the image recording device, the two combined units 60, 80 can be removed as a whole from the image forming part and the jam or the like can be dealt with. Needless to say, the two combined units 60, 80 can be attached to the image forming part again after the accident has been fixed.

Figure 15:
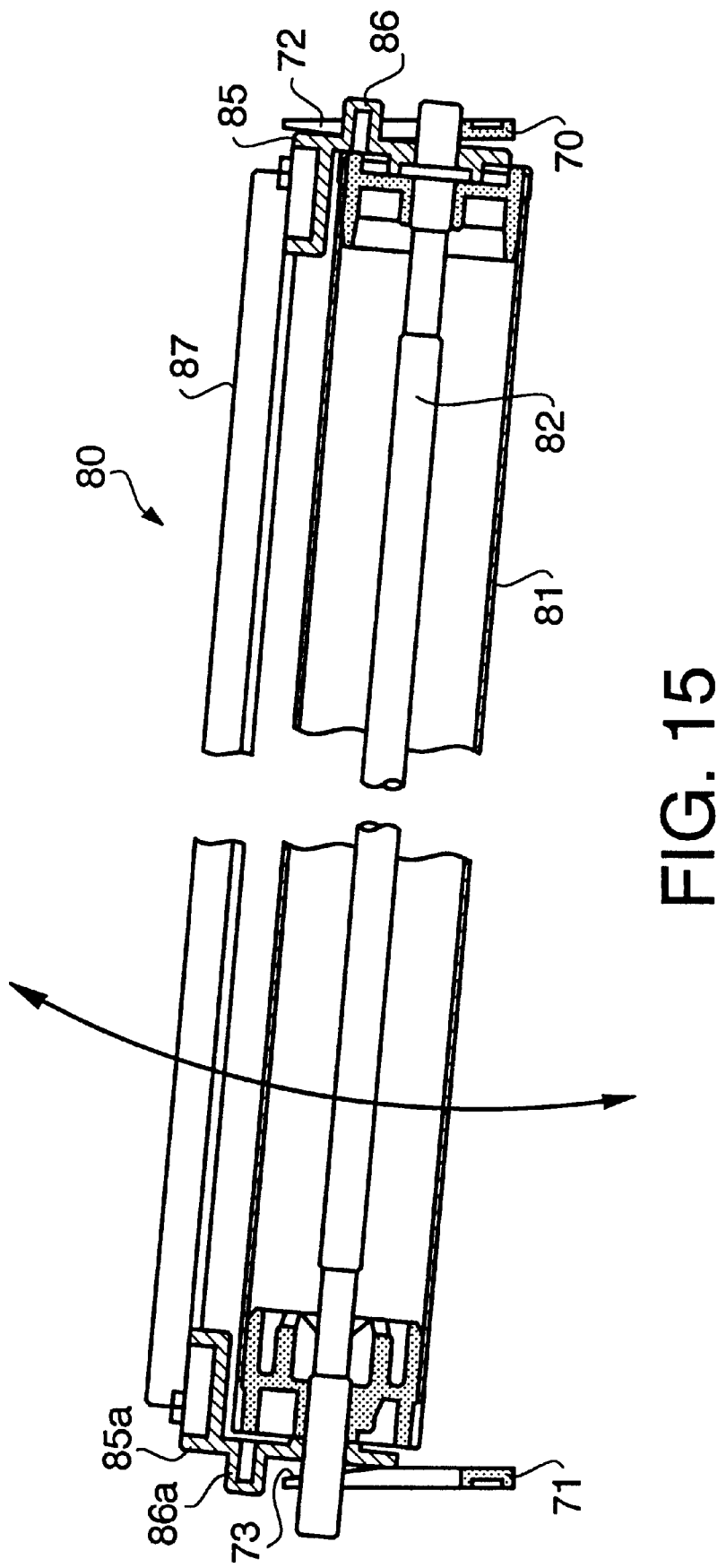
FIG. 15 is an explanatory diagram showing an assembly operation of the photosensitive unit onto the development unit.

As shown in FIG. 9, the inner sides 73 of the support bodies 70, 71 of the development unit 60 are formed to be tapered. Therefore, when the photosensitive unit 80 is attached to the development unit 60, the photosensitive unit 80 can be easily attached to the development unit 60 as shown in FIG. 15. More specifically, when the photosensitive unit 80 is to be attached to the development unit 60, the photosensitive unit 80 is brought to the development unit 60 in a slightly tilted (in the width direction) state and one of the side frame 85 is aligned against its corresponding support body 70. Then, the other side frame 85a is aligned against the other support body 71 and the both side frames 85, 85a are attached to the support bodies 70, 71. In this case, as the tapered sides 72, 73 formed as the inner sides of the support bodies 70, 71 reliably guide the both side frames 85, 85a of the photosensitive unit 80 during the attachment operation, troubles such as the lower part of each side frame of the photosensitive unit 80 getting hooked at the upper part of the support body or the like can be prevented, making the attachment of the photosensitive unit 80 always easy.

If the support bodies were not formed to have tapered inner sides, there could not be so large a gap between the side frame of the photosensitive unit 80 and the inner side of the support body and a perfectly horizontal state of the photosensitive unit 80 would be required during its attachment to the development unit 60. This makes the assembly operation of the two units 60, 80 very troublesome and will negatively affect on the efficiency and reliability of the operation. However, such problems and inconveniences can surely be avoided in the present invention because of the unique shape of the support bodies 70, 71.

The embodiment described above mainly refers to a facsimile device. However, the device according to the present invention in which the process unit and the scan device are supported by the upper frame and the lower frame respectively can be realized as a digital image recording device. In addition, the present invention can be realized as a device in which a facsimile device and the image recording device are combined.

What is claimed is:

1. A process unit for an electrophotographic image recording device having a main body and where toner image is electrophotographically formed on a photosensitive drum and the toner image is transferred onto paper, comprising:

a photosensitive unit removably attached to the main body;

a development unit removably attached to the main body;

a first removal/attachment mechanism provided in the photosensitive unit; a second removal/attachment mechanism provided on the development unit; the first and second mechanisms being attachedable to/separable from each other, wherein when the first and second removal/attachment mechanisms are attached to each other, the photosensitive unit and the development unit form an integral unit that is removable from the main body;

a pair of support bodies as the second removal/attachment mechanism projecting from the development unit to the photosensitive drum;

a pair of drum shaft end portions as the first removal/attachment mechanism projecting from a drum shaft of the photosensitive drum on both sides of the photosensitive unit;

a pair of pin members as the first removal/attachment mechanism provided such that they project from both sides of the photosensitive unit; and an engagement groove formed in each support body for receiving each corresponding drum shaft end portion and pin member and for aligning the photosensitive unit against the development unit when they are assembled.

2. The process unit for an electrophotographic image recording device of claim 1, wherein each engagement groove is provided with a holding member capable of resiliently changing its form for pressing and thus holding each drum shaft end portion and each pin member in each engagement groove.

3. A facsimile device comprising:

a main body frame accommodating an electrophographic recording part and having an openable intermediate cover that protects the accommodated electrophotographic recording part and when opened through which the electrophotographic recording part can be approached, the intermediate cover being rotatable to be opened; and a scan part frame, having a scan part capable of scanning a document fixedly placed on a platen or a document moving through the scan part, being placed on the main body frame and rotatable around a fulcrum axis located along one side of the main body frame, the scan part frame being rotatable in the same direction as the intermediate cover rotates.

4. The facsimile device of claim 3, further including an electrophotographic process unit for electrophotographic process provided in the main body frame, the process unit being removable from/attachable to the main body frame by opening the intermediate cover and moving the unit in the vertical direction, the process unit being fixedly held at its standard operational position when the intermediate cover is closed.

5. The facsimile device of claim 3 or 4, further including:

a platen provided on the upper surface of the scan part frame for loading a document on it;

an upper open/close frame provided on the platen and having a document feed tray for inserting a document to be scanned and a document discharge tray for discharging the document, the document feed tray and the document discharge tray being provided in the upper part of the upper open/close frame, the upper open/close frame being rotatable around an axis that extends horizontally and perpendicular to the open/close direction of the scan part frame, the open/close direction being the fulcrum axis direction; and an automatic document feeder provided on the scan part frame on its fulcrum axis side adjacent to the upper open/close frame, for having the document from the document feed tray make a U turn and feeding it to the document discharge tray.

6. A process unit for an electrophotographic image recording device having a main body and where toner image is electrophotographically formed on a photosensitive drum and the toner image is transferred onto paper, comprising:

a photosensitive unit removably attached to the main body;

a development unit removably attached to the main body;

a first removal/attachment mechanism provided in the photosensitive unit; and a second removal/attachment mechanism provided in the development unit, the first and second removal/attachment mechanisms being attachable to/separable from each other, wherein when the first and second removal/attachment mechanisms are separated from each other, the photosensitive unit and the development unit are each independently removable from the main body.

* * * * *